United States Patent
Gupta et al.

(10) Patent No.: US 6,771,991 B1
(45) Date of Patent: Aug. 3, 2004

(54) GRAPHICS AND VARIABLE PRESENCE ARCHITECTURES IN WIRELESS COMMUNICATION NETWORKS, MOBILE HANDSETS AND METHODS THEREFOR

(75) Inventors: Sanjay Gupta, Lakewood, IL (US); Rick Frayder, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/108,880

(22) Filed: Mar. 28, 2002

(51) Int. Cl.[7] .................................................. H04B 1/38
(52) U.S. Cl. ...................... 455/566; 455/414.1; 455/517
(58) Field of Search ................................. 455/566, 517, 455/456.1, 456.2, 518, 414.1; 709/227, 204, 202, 224

(56) References Cited

U.S. PATENT DOCUMENTS

| | | | |
|---|---|---|---|
| 6,463,471 B1 * | 10/2002 | Dreke et al. ................. | 709/224 |
| 6,512,930 B2 * | 1/2003 | Sandegren .................... | 455/518 |
| 2003/0018704 A1 * | 1/2003 | Polychronidis et al. ...... | 709/202 |
| 2003/0060215 A1 * | 3/2003 | Graham ........................ | 455/456 |
| 2003/0060240 A1 * | 3/2003 | Graham et al. .............. | 455/566 |
| 2003/0065788 A1 * | 4/2003 | Salomaki ..................... | 709/227 |
| 2003/0073440 A1 * | 4/2003 | Mukherjee et al. .......... | 455/435 |

* cited by examiner

Primary Examiner—Quochien B. Vuong
(74) Attorney, Agent, or Firm—Roland K. Bowler, II

(57) ABSTRACT

Methods in mobile wireless communication handsets and other subscribers, including requesting presence information (210) for a predefined entity, receiving presence information regarding the presence of the predefined entity in response to the request (228), displaying a graphic presence information, and in some embodiments variable presence information, on the mobile wireless communication handset when the predefined entity is present based upon the presence information received.

12 Claims, 3 Drawing Sheets

GRAPHICS AND VARIABLE PRESENCE ARCHITECTURES IN WIRELESS COMMUNICATION NETWORKS, MOBILE HANDSETS AND METHODS THEREFOR

FIELD OF THE INVENTIONS

The present inventions relate generally to presence services, and more particularly to presence architectures, including presence servers in wireless communications networks, capable of providing graphical and variable presence information, and to mobile communications handsets capable of displaying graphical and variable presence information, and methods therefor.

BACKGROUND OF THE INVENTIONS

"Presence" services in communication networks are known generally including, for example, the popular "Buddy List" presence and instant messaging services of America OnLine (AOL). The AOL "Buddy List" is a pop-up window at an AOL subscriber station that lists other pre-selected or identified AOL subscribers, known as "Buddies", when the pre-selected "Buddies" are on-line or "present". The AOL "Buddy List" is updated dynamically as subscribers come on-line and go off-line. AOL members are thus able to know which of their pre-selected "Buddies" are on-line and off-line.

The association of graphical icons with a user's presence is also known, for example the AOL service allows users to select an icon from a list of predefined icons to be associated with their presence. The selected icon is displayed in association with the user's presence adjacent the user's username on AOL Buddy Lists.

The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTIONS

The inventions relate generally to enhanced or to enhancing presence services, including presence services for wireless subscribers, by providing presence information, including variable textual and non-textual information, for example graphical images, to presence service subscribers, which may display presence information associated with the entities for which presence information was requested, as discussed further below.

In some embodiments, the presence information provided to, or received by, subscribers depends upon the hardware and software capabilities of the subscriber unit, for example whether or not the subscriber unit is capable of generating and/or displaying graphical information. Presence information, for example graphical presence images, may be generated, or rendered, locally on the subscriber unit. Alternatively, this information may be received pre-rendered by the subscriber, for example from a presence server or from some other source. Some embodiments of the inventions thus enable subscribers with limited image rendering abilities, for example without the ability to generate graphical images, to display graphical presence information, as discussed more fully below.

In other embodiments of the inventions, the presence information provided to subscribers depends upon personal identity of the individual associated with a particular subscriber unit receiving presence information, for example one's spouse may be designated to receive different presence information from a particular entity than one's professional colleagues, who in turn may be designate to receive different presence information than one's social friends, as discussed more fully below.

Figure 1:
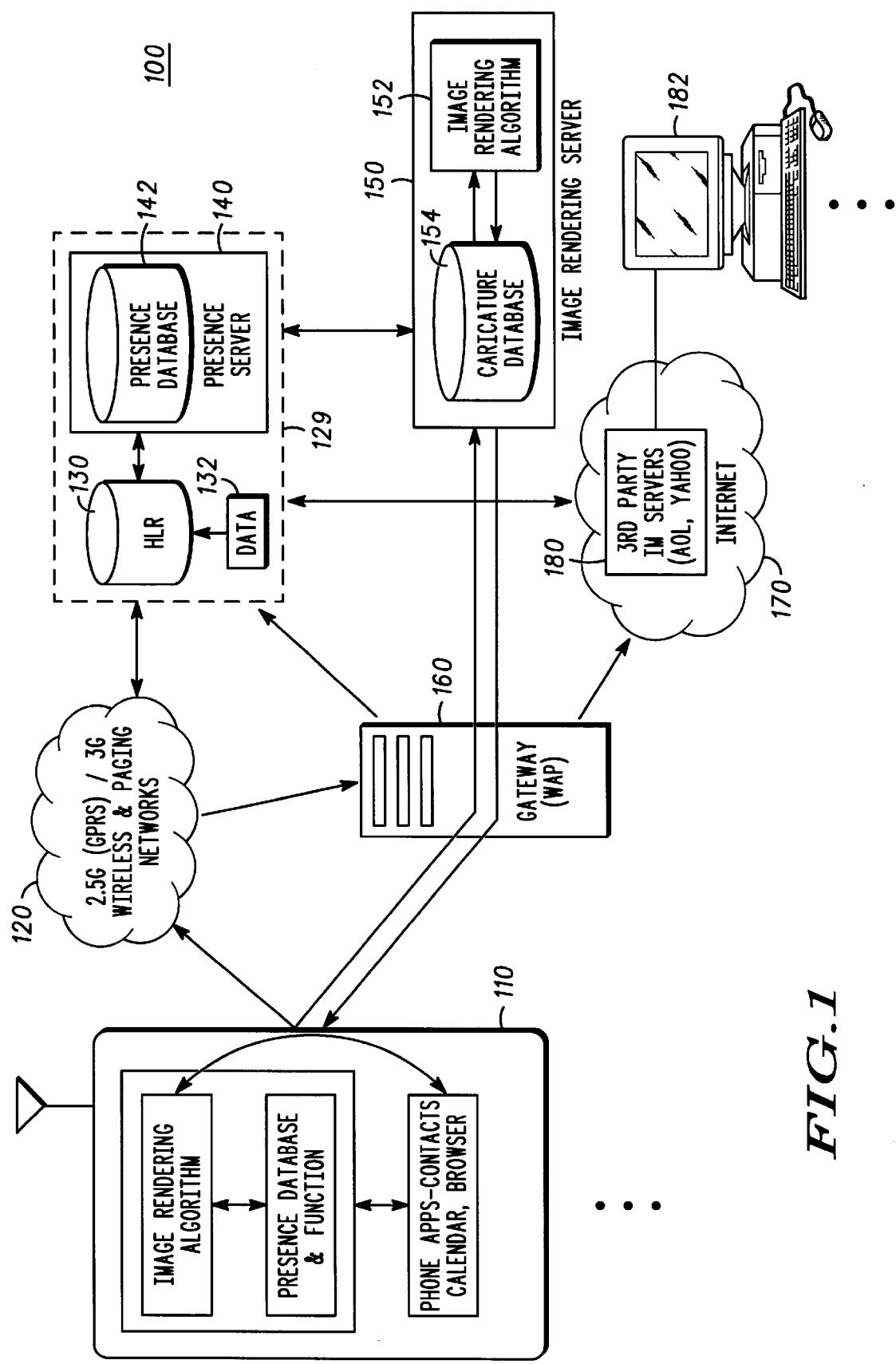
FIG. 1 is an exemplary functional communication architecture diagram, supporting wireless communications, in which the subject matter of the present invention may be practiced.

In the system 100 of FIG. 1, a wireless communication device 110, for example, a two-way pager, or a cellular handset or some other two-way radio communications enabled mobile device, communicates over a wireless network 120, for example, a 2.5 G GPRS or 3 G wideband CDMA communications network or some other wireless or paging network.

In one embodiment, the. network is commnunicably coupled to a home subscriber system 129, for example a home location register (HLR) 130 and database 132 with wireless network subscriber information, including generally personal subscriber information and subscriber device information. In the exemplary embodiment, the HLR 130 also communicates with a presence server 140 comprising a presence database 142. More generally, more than one home subscriber unit may communicate with the presence server.

In some presence architectures, the home subscriber system 129 and the presence server 130 are coupled to an image-rendering server 150, which may be located remotely from the presence server 130, or with one or the other of the HLR 130 or the presence server 130. In other embodiments, the image-rendering server 150 and the presence server 130 are integrated so that they are one and the same.

In the presence architecture of FIG. 1, a gateway 160, for example a wireless application protocol (WAP) gateway or some other gateway is communicably coupled to the wireless network 120, to the HLR 130 and presence server 140, to the image-rendering server 150, and also to WAP or other gateway enabled mobile wireless communications devices, one of which is illustrated at 110. FIG. 1 also illustrates the gateway 160 coupled to the Internet 170 or to some other network, which is likewise communicably coupled to the HLR 130 and to the presence server 140. The Internet 170 also has associated therewith multiple $3^{rd}$ party service providers 180, for example Yahoo, AOL, among others, which may have corresponding Instant Messaging (IM) servers. The $3^{rd}$ party service providers typically have multiple service subscribers 182 with instant messaging and presence services. Thus the subscribers and subscriber units referred to herein are not limited to wireless subscribers, but include more generally other types of subscribers as well, all of which may communicate and provide presence information to each other.

In some embodiments, a graphical image is displayed at the wireless subscriber requesting presence information based upon the presence information received in response to a request made for presence information of another entity.

The graphical information may indicate whether the entity is present or not, and the graphical information may also include additional time-dependent information about the entity, as discussed further below.

In some embodiments, a graphical image is uniquely associated with a particular entity, for example, an entity may have associated therewith a unique graphical image or a caricature. Alternatively, the graphical image may be a graphically or textually modified image that is selected from a group of predefined images. The graphical image associated with the entity may also be some other unique image or an image selected from a group of standard images, or an image created by the entity.

In some embodiments, the presence information for a particular entity changes from time to time dependent upon a variable characteristic or attribute or activity or condition of the entity. The variable presence information thus not only indicates presence (or absence), it is also capable of indicating graphically some other information about the entity at a particular time.

In one embodiment, a graphical image or caricature corresponding to the entity is modified based upon some changing attribute or characteristic or condition of the corresponding entity, for example, the entity's mood, availability, location, desire, or some other peculiarity or circumstance related to or surrounding the entity at a particular time.

In one embodiment, a baseline image or caricature corresponding to the entity is changed depending upon an attribute or condition of the entity, for example the entity's psychological disposition, by changing facial expressions and/or body language of the corresponding baseline image or caricature. In other embodiments, the graphical image or caricature may be modified in other ways to provide an instantaneous indication of some state or condition of the entity. Alternatively, the image or character may be combined with other images or characters or text to communicate something besides the presence of the entity. For example, the image or caricature may be posed seated at a desk to indicate the entity is at work, or the image or caricature may be posed performing a leisure activity to indicate relaxation. Alternatively, a baseline image or caricature may be modified based upon historical information, for example information stored on the subscriber unit or at the presence server or at some other information repository. These and other aspects of the invention are discussed further below.

Figure 2:
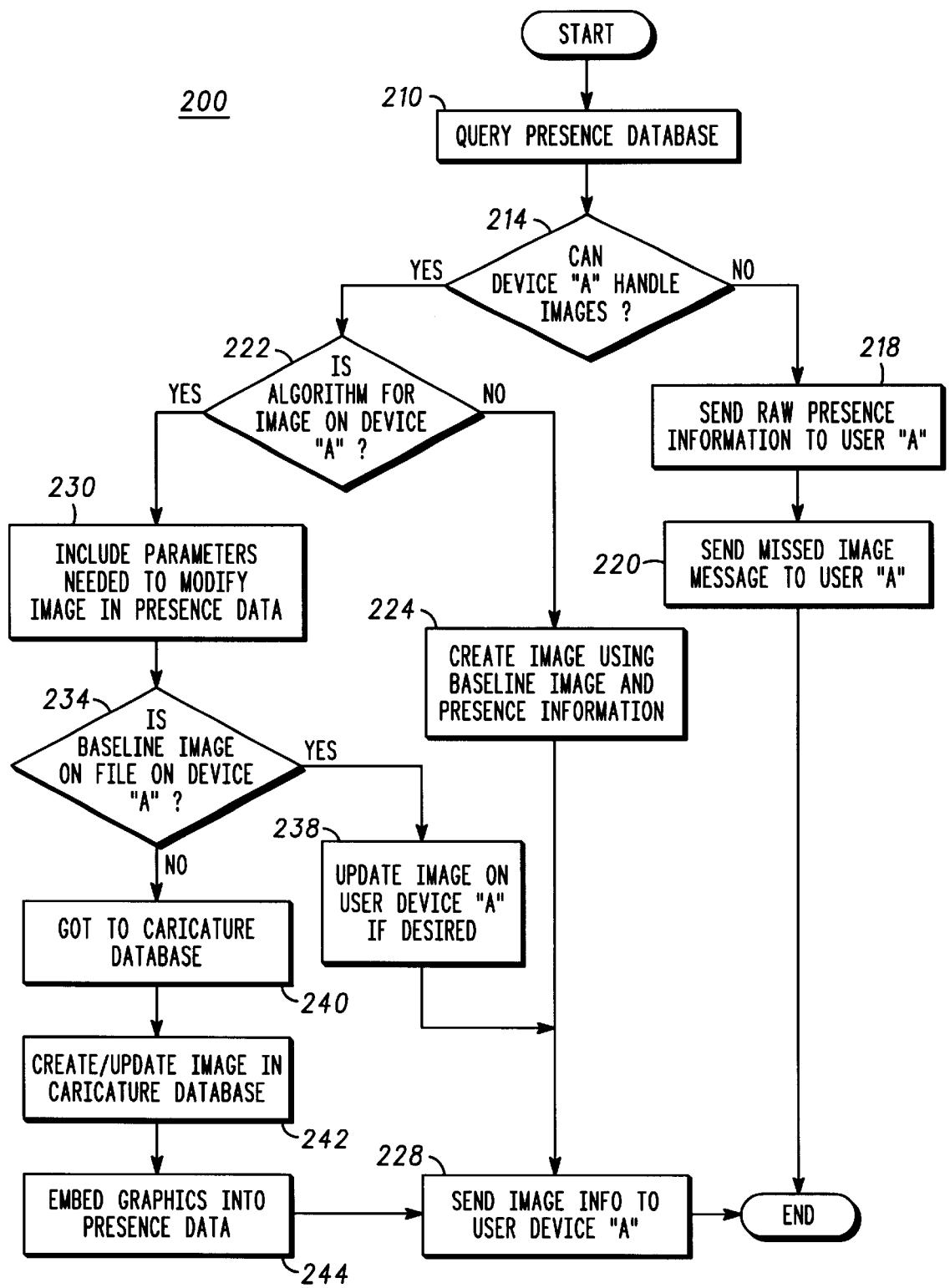
FIG. 2 is an exemplary flow diagram for communicating presence information to a mobile wireless communication device.

FIG. 2 is an exemplary generalized process flow diagram 200 for providing wireless presence services to a mobile wireless communication device, or wireless subscribers, and more particularly to sending presence information of Device "A" to a subscriber unit requesting presence information. At block 210, the mobile wireless communications device, referred to herein as a wireless subscriber or a subscriber or a subscriber unit, requests presence information for one or more other predefined entities, for example information regarding the presence of other entities, sometimes referred to as presentities. The process may be initiated upon powering up the subscriber unit or upon some other event, for example upon opening a browser or instant messaging application or some other application, or by performing some operation on the handset.

In the present patent description, graphical rendering capability refers to the ability of subscriber units and servers to construct or generate graphical images, for example from raw data, for display on a display device, for example an LCD of a wireless device. It also refers to the ability of subscriber units and servers to revise or modify graphical images for display. Some subscriber units are capable of rendering and displaying graphical information, while other subscriber units are only capable of displaying graphical information, and are incapable of rendering graphical images. Other subscriber units are incapable of rendering or displaying graphical information.

In applications where the presence server or other presence information source provides graphical presence information to subscribers either by sending it directly or by providing information where it can be obtained, it may be desirable for the presence server to know whether the subscriber requesting presence information is capable of displaying graphical information other than textual information.

In FIG. 2, at block 214, a determination is made whether the subscriber, Device "A", requesting presence information is capable of displaying images or graphical presence information, for example information other than text.

In FIG. 1, in some presence architectures, the subscriber's image displaying capabilities are accessible by the HLR 130 from a database, for example from the database 132, which includes subscriber profile information. In other presence architectures, this information may be stored on another database accessible by the presence server 140, for example it may be stored on the presence database 142. Alternatively, the graphics display capability of the subscriber may be communicated to the presence server at the time of the presence information request.

In FIG. 2, at block, 218, in scenarios where the subscriber unit is incapable of displaying graphical information, for example images or caricatures, the presence server does not send graphical presence information to the subscriber in response to its request for presence information. Under these circumstances, the presence of the entity is not indicated by the display of graphical information. Instead, presence may be indicated by some other conventional means, for example by displaying only textual information.

In some embodiments, each entity is capable of designating what presence information is to be provided to subscribers capable of displaying graphics information and what presence information is provided to subscribers incapable of displaying graphics information. For example, an entity may designate that certain textual presence information be sent to subscribers incapable of displaying graphical information, and that both graphical and textual information be sent to subscribers capable of displaying graphics information. The presence information that each entity designates for particular subscribers may be stored in a database, for example the presence database 142 in FIG. 1 or at some other location accessible by the presence server. This feature also permits entities to specify, or tailor, the presence information provided to particular subscribers or groups of subscribers who may request presence information of the entity. Thus, when a subscriber requests presence information for a particular entity, the presence server sends only the presence information designated for that particular subscriber.

In some presence applications, subscribers incapable of displaying graphical information may also receive a message indicating that graphical information was available for a particular entity, but that the graphical information was not sent to the subscriber in response to the request because the subscriber is incapable of displaying images.

In FIG. 2, at block 220, the subscriber receives an indication that graphical information was available for a particular entity, but that the graphical information was not sent. In other applications, graphical information received by subscriber units incapable of displaying graphics information is merely discarded. Preferably, graphics information is not sent to subscribers without graphics capabilities, since bandwidth usage may be reduced by reducing message content.

In embodiments where the subscriber unit is capable of displaying graphics information, the presence server transmits presence information, at least indicating whether the one or more entities for which presence information is requested are present or not. More generally, the presence information may include graphical information and information required for displaying variable graphics or other variable information. At the subscriber, presence information, including graphics and/or textual information, is displayed on the subscriber for entities for which presence information was requested by the subscriber based upon the presence information received.

In some applications, the subscriber unit is capable of displaying graphics information but is incapable of rendering graphics images locally on the subscriber unit. In FIG. 2, a determination is made at block 222 whether Device "A" can render or modify graphics images locally. This determination may be made, for example, based upon profile information stored in the HLR database 132 or based upon information obtained from some other database, or alternatively by communicating the graphics rendering capability information of the subscriber to the presence server at the time of the request.

Where the requestor or subscriber unit is capable of displaying graphics but incapable of rendering or modifying graphics, any presence graphics image information communicated to the subscriber unit is preferably pre-rendered before receipt by the subscriber. In other words, the graphics image information received by the subscriber is in a form suitable for display by the subscriber without any further graphical rendering.

In FIG. 1, a graphical image may be constructed, or pre-rendered, at the presence server 140, for example, prior to transmission to a particular subscriber based upon information stored on the presence server indication that the subscriber is incapable of modifying graphical images locally. Alternatively, the graphical image may be rendered at a dedicated image-rendering server 150, which uses an imaging-rendering algorithm 152 to render the graphical image based upon information obtained from a graphics image database 154. Alternatively, the pre-rendered graphics image may be derived or obtained from a source other than the database 154, for example from profile information stored in the HLR database 132, or from information stored on the presence server 140. In the process flow diagram of FIG. 2, the creation of pre-rendered image occurs at block 224.

In response to a request for subscriber information, in some embodiments, the subscriber receives a graphical image completely pre-rendered. The image may originate either from the presence server or from a graphics image source, for example, directly from the image-rendering server 150 in FIG. 1, or from some other source. In FIG. 2, the pre-rendered image is transmitted to the subscriber, user Device "A", at block 228. Thereafter, the pre-rendered graphical image is displayed at the subscriber unit.

In embodiments where the subscriber is capable of generating or rending graphics images, as determined at block 222 in FIG. 2, the graphical image associated with the predefined entity based upon the presence information received may be at least partly generated at the subscriber unit. Thereafter, the graphical image is displayed on the subscriber unit when the predefined entity for which presence information was, requested is present based upon the presence information received in response to the request.

In applications where the subscriber is capable of rending graphical images locally, all of the information necessary to generate a presence graphical image on the subscriber may be received in response to the request. In other embodiments, at least some of the graphical information is stored on the subscriber units, for example a baseline character image or caricature for each entity on the subscriber's presentity list. In this exemplary embodiment, the subscriber receives, at a minimum, information indicating whether the entities sought are present in response to the request. In other applications, the subscriber unit receives graphical presence information, which the subscriber uses to generate a graphical image on the subscriber unit.

Storing at least some of the graphical information on the subscriber unit for each presentity the subscriber has interest in reduces data traffic, since the graphics information for each entity need not be transmitted in response to each request unless an updated baseline image is sent to the subscriber, as discussed more fully below.

In the exemplary diagram of FIG. 2, at block 230, the subscriber receives presence information required to modify presence image, for example a baseline caricature, stored on the subscriber unit. Thus in some embodiments, it is desirable for the presence server to know whether the subscriber as baseline image information for any of the entities for which presence information is requested, as indicated at block 234 in FIG. 2. This information may be communicated by the subscriber to the presence server, or the presence server 140 may obtain this information from some other source, for example from the HLR data base 132, or from presence database 142, thus eliminating the need to resend graphic data in response to each request.

At block 238, in FIG. 2, presence information, for example a new or updated image for Device "A", is obtained, at block 228, for transmission to a subscriber unit requesting presence information about Device "A". The subscriber thus subsequently updates the baseline image or some other graphic information for presentity Device "A" already stored on the subscriber unit. The subscriber may also store thereon a variety of graphical facial expressions or other graphical images for use in combination with the baseline character, based on the presence information received in response to the request. For example, if the presence information received at the subscriber indicates that the entity is cheerful, the subscriber modifies the baseline caricature with a cheerful face. Alternatively, if the entity is saddened, the subscriber modifies the caricature with a sad face.

Also, at block 238, the presence server may obtain information required for the subscriber unit to render a variable image by modifying the baseline image, and then send that information to the subscriber at block 228. Assume, for example, that the subscriber has stored thereon a baseline image for a particular entity, say a caricature, and in response to the request, the server or some other source sends to the subscriber another image, for example an Egyptian image, with instructions to combine the caricature with the Egyptian image, thus indicating that the entity is presently in Egypt or participating in some related activity.

In some embodiments, entities have the ability to update graphic information dynamically for distribution by the presence server to subscribers. During a particular session, for example, the entity may go from the office to home, or change moods. According to this aspect of the invention, the subscriber receives updated presence information for all entities for which presence information is requested. Thus if an entity effects any update or change in its presence information, the update or change is communicated to the subscriber. And, as noted above, updates from the entity may be subscriber specific, so that the entity may update its presence information for some subscribers and not others. In some embodiments, the updated presence information is sent immediately to the subscriber, and in other embodiments the updated presence information is not sent until the beginning of the next session.

In some embodiments, subscribers will display graphical information for multiple entities simultaneously. In one embodiment, the subscriber graphically organizes the graphical presence information displayed, for example based upon one or more elements of commonality among the entities. This embodiment is particularly useful in applications where the graphical presence information displayed has a time varying elements. For example, where two or more entities are known to be at a common location, for example at work, based upon the graphical presence information received, the subscriber may graphically combine or otherwise modify the graphical presence information displayed for these entities. Graphical presence information, for example caricatures, for entities attending the same meeting may be grouped together, for example, seated at a table.

In FIG. 2, at block 240, where there is no baseline image stored on the subscriber, an image for each entity present is obtained from a database, for example, the caricature database 154 or some other database. The image obtained from the caricature or other database may then be embedded with the presence information at block 244 and sent to the subscriber at block 228. In FIG. 2, at block 242, in some embodiments, the baseline image obtained from the caricature or other database is updated or edited before it is sent to the subscriber.

Figure 3:
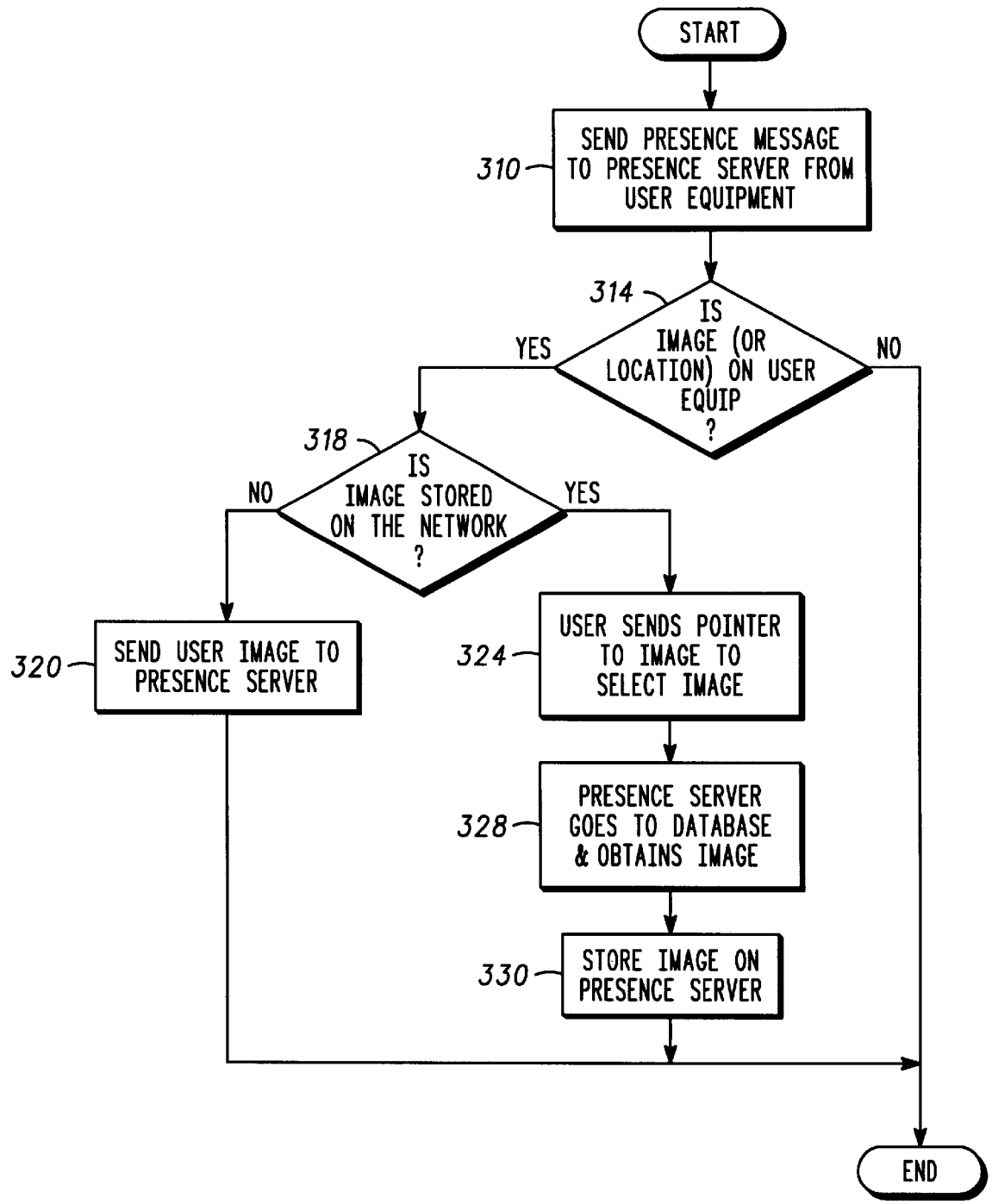
FIG. 3 is an exemplary flow diagram for creating and updating presence information on a network.

FIG. 3 is an exemplary flow diagram for creating and updating presence information on a server. In one embodiment, wireless and other subscribers having corresponding presence information, including any graphical and/or textual information, provide the graphical information image to the presence server at least one time. This presence information or parts thereof may be updated periodically, as noted above. Alternatively, the subscriber provides the presence server with a pointer or an address where the image or image elements may be located by the presence server or by other subscribers. In either case, the entities can update all or parts of the presence information at any time, and the updated information will be communicated to the subscribers requesting presence information according to schedule of the presence service provide, preferably immediately.

In some applications, the images or portions thereof, for example a baseline caricature, for one or more subscribers are stored on other subscriber units. The image or portions thereof may be obtained from and updated by the presence server, as discussed above in connection with block 238 of FIG. 2. Alternatively, subscriber units may obtain the baseline image from some other source based upon a pointer or address obtained from the presence server or from the entity with which the image is associated.

In FIG. 3, at block 310, a subscriber, or user equipment (UE), sends a presence message to the presence server, indicating that the UE is present. At block 314, at determination is made whether graphical image information associated with the subscriber is stored on the subscriber unit or stored at some other location. At block 318, a determination is made whether the image location is stored on the network. If not, at block 320, the image is sent either to the presence server or to a caricature database and possibly to an HLR.

In FIG. 3, at block 318, if the image is on the network, in some embodiments the subscriber sends, at block 324, a pointer or address to the presence server where the image may be located. At block 328, the presence server obtains the image, and in some embodiments the presence server stores a copy of the image on the presence server database for subsequent use, at block 330.

The present inventions thus provide new presence applications including graphical and variable presence images that substantively enhance presence services, particularly in but not limited to wireless environments. While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments, disclosed herein and that myriad modifications and variations may be made thereto without departing from the scope and spirit of the inventions, which are to be limited not by the exemplary embodiments but by the appended claims.

What is claimed is:

1. A method in a mobile wireless communications handset, comprising:
   requesting presence information for a predefined entity;
   receiving presence information regarding the presence of the predefined entity in response to the request;
   rendering a graphical image on the mobile wireless communications handset associated with the predefined entity based upon the presence information received,
   the graphical image uniquely associated with not more than the predefined entity for which presence information was requested;
   displaying the graphical image on the mobile wireless communications handset.

2. The method of claim 1, indicating whether the mobile wireless communications handset is capable of rendering graphical images before receiving the presence information.

3. The method of claim 1, rendering the graphical image on the mobile wireless communications handset by modifying a base image stored on the mobile wireless communications handset with the information received.

4. A method in a presence server for a wireless communications network, comprising:
   at a presence server, receiving a request for presence information of a particular entity;
   at the presence server, providing graphical presence information associated with the particular entity in response to the request,
   the graphical presence information provided by the presence server in response to the request is not pre-rendered.

5. The method of claim 4,
   at the presence server, receiving graphical image rendering capability information of user equipment initiating the request for presence information,
   providing a pre-rendered graphical image in response to the request if the user equipment is incapable of rendering a graphical image.

6. The method of claim 4, at the presence server, providing variable graphical presence information uniquely associated with the particular entity in response to the request, the variable graphical information dependent upon at least one variable attribute of the particular entity.

7. A method in a mobile wireless communications handset, comprising:

requesting presence information for a predefined entity;

receiving presence information in response to the request;

rendering a variable image on the mobile wireless communications handset based upon the presence information received, the variable image dependent upon at least one variable attribute associated with the predefined entity, displaying the variable image on the mobile wireless communications handset.

8. A method in a mobile wireless communications handset, comprising:

requesting presence information for a predefined entity;

receiving presence information regarding the presence of the predefined entity in response to the request;

displaying a variable image on the mobile wireless communications handset based upon the presence information received and historical information pertaining to the predefined entity.

9. A method in a mobile wireless communications handset, comprising:

requesting presence information for an entity;

receiving presence information regarding the presence of the entity in response to the request;

displaying graphical presence information on the mobile wireless communications handset based upon the presence information received in response to the request, the graphical presence information associated with an attribute of the entity other than the presence of the entity.

10. A method in a mobile wireless communications handset, comprising:

requesting presence information for a predefined entity;

receiving presence information regarding the presence of the predefined entity in response to the request;

receiving an address to a source where baseline graphical information for the predefined entity may be obtained;

displaying graphical presence information on the mobile wireless communications handset based upon the presence information received in response to the request.

11. A method in a mobile wireless communications handset, comprising:

requesting presence information;

receiving presence information in response to the request;

displaying graphical presence information on the mobile wireless communications handset for a plurality of entities based upon the presence information received in response to the request, graphically organizing the graphical presence information displayed based upon elements of commonality other than the presence of the entities.

12. The method of claim 11, the graphical presence information displayed for each entity is a time varying image, graphically organizing the graphical presence information displayed based upon elements of commonality among the time varying images.

* * * * *